US010150226B2

(12) United States Patent
Giles et al.

(10) Patent No.: US 10,150,226 B2
(45) Date of Patent: Dec. 11, 2018

(54) ROBOTIC APPARATUS FOR PROCESSING TIMBER USED IN CONSTRUCTION OF A LOG HOME

(71) Applicant: Hearthstone, Inc., Dandridge, TN (US)

(72) Inventors: Randy K. Giles, Dandridge, TN (US); Terry Hartsell, Newport, TN (US)

(73) Assignee: Hearthstone, Inc., Dandridge, TN (US)

( * ) Notice: Subject to any disclaimer, the term of this patent is extended or adjusted under 35 U.S.C. 154(b) by 304 days.

(21) Appl. No.: 15/237,101

(22) Filed: Aug. 15, 2016

(65) Prior Publication Data

US 2017/0043496 A1 Feb. 16, 2017

Related U.S. Application Data

(60) Provisional application No. 62/205,323, filed on Aug. 14, 2015.

(51) Int. Cl.

| *B27C 9/04* | (2006.01) |
| *B25J 11/00* | (2006.01) |
| *B25J 15/00* | (2006.01) |
| *B27B 31/00* | (2006.01) |
| *B27B 29/00* | (2006.01) |

(52) U.S. Cl.
CPC ............ *B27C 9/04* (2013.01); *B25J 11/0055* (2013.01); *B25J 15/0019* (2013.01); *B27B 29/00* (2013.01); *B27B 31/006* (2013.01)

(58) Field of Classification Search
CPC ........... B27B 1/00; B27B 1/002; B27B 1/005; B27B 1/007; B27B 25/00; B27B 25/02; B27B 29/00; B27B 29/02; B27B 29/04; B27B 29/06; B27B 29/08; B27B 29/10; B27B 31/00; B27B 31/003; B27C 9/00; B27C 9/02; B27C 9/04; B25B 11/00; B25B 11/02
USPC .................................................... 269/37, 291
See application file for complete search history.

(56) References Cited

U.S. PATENT DOCUMENTS

| 5,095,605 | A | * | 3/1992 | Tonus | ...................... | B27F 7/003 |
| | | | | | | 227/152 |
| 5,505,028 | A | | 9/1996 | Giles | | |
| 7,272,882 | B1 | * | 9/2007 | Onsrud | .................. | B23Q 3/002 |
| | | | | | | 29/564 |
| 9,221,189 | B2 | * | 12/2015 | Lachance | ............. | B21D 28/243 |

* cited by examiner

*Primary Examiner* — Matthew G Katcoff
(74) *Attorney, Agent, or Firm* — Pitts & Lake, P.C.

(57) ABSTRACT

A robotic apparatus for processing the timber logs intended to be used in the construction of a log structure. The robotic apparatus includes at least a vertical clamp assembly, a horizontal clamp assembly, a roller clamp assembly, a central log processing assembly, and a conveyor. The central log processing assembly allows multiple processes to be performed sequentially on the same machine requiring much less equipment and less labor in the handling and processing of the logs. By utilizing multiple tool masts, a primary mast can be performing a primary process while the secondary mast is selecting the tool appropriate to the next or secondary process.

17 Claims, 18 Drawing Sheets

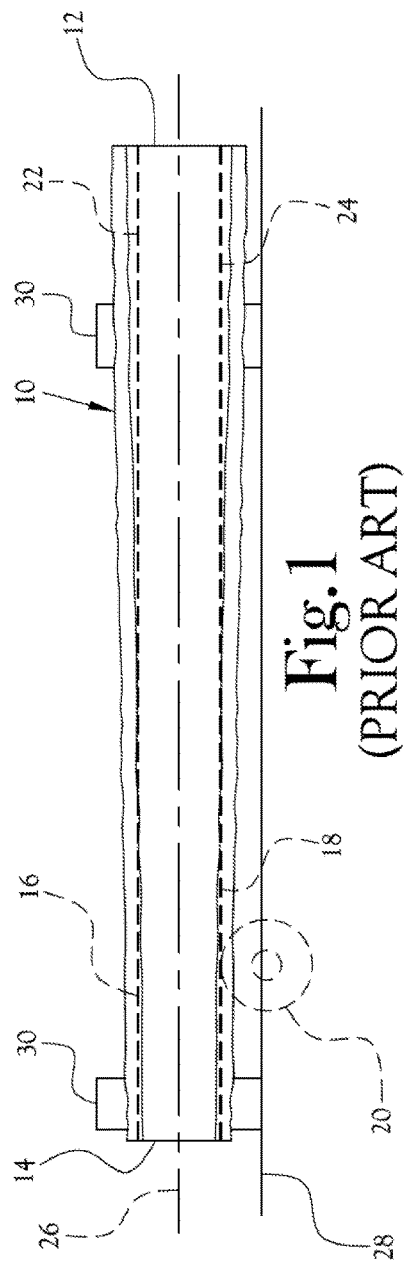
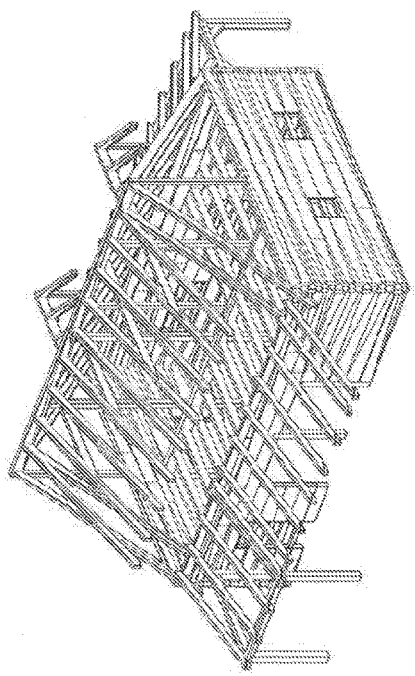

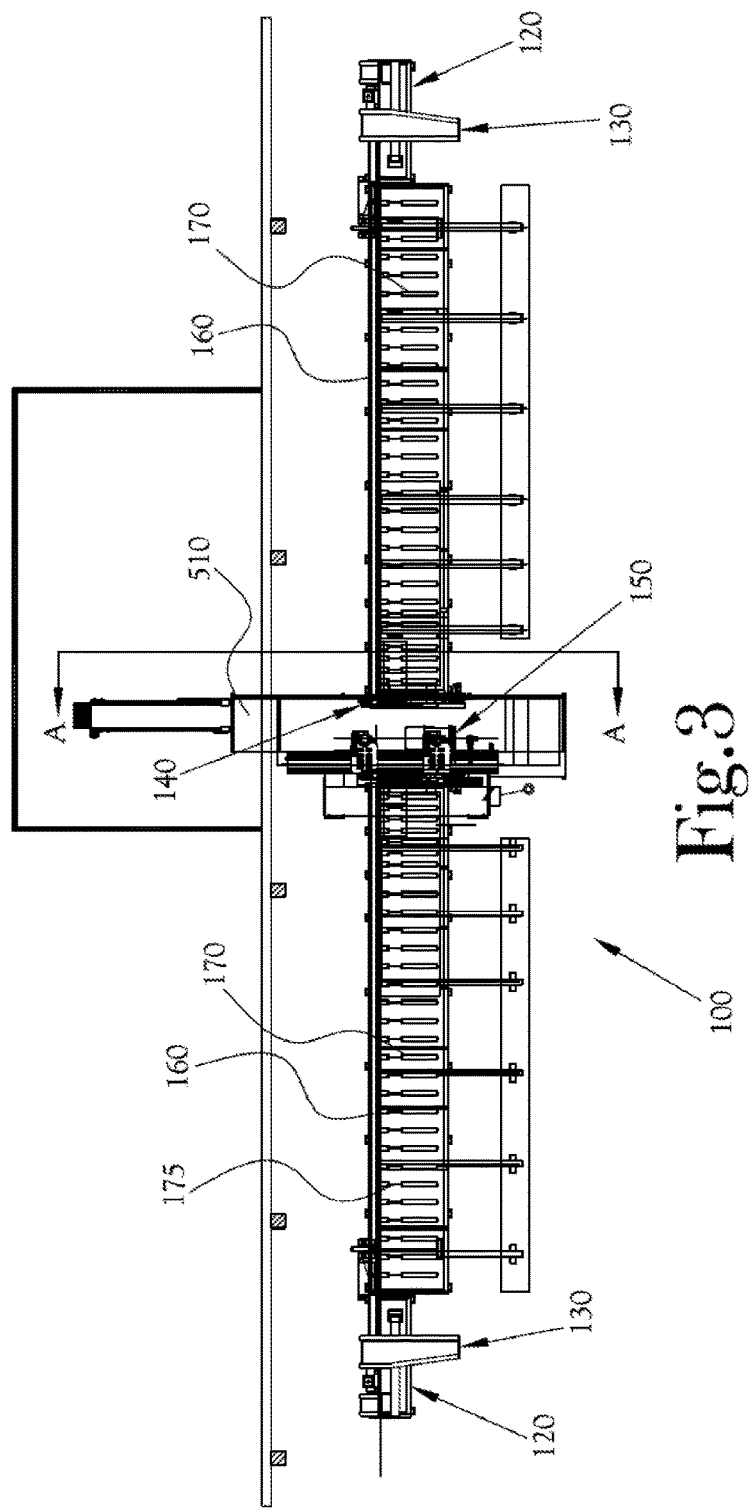

ROBOTIC APPARATUS FOR PROCESSING TIMBER USED IN CONSTRUCTION OF A LOG HOME

CROSS-REFERENCE TO RELATED APPLICATIONS

This application claims the benefit of U.S. Provisional Patent Application No. 62/205,323, filed on Aug. 14, 2015, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to an apparatus for processing timber to be used in the construction of a log home. More particularly, it relates to a multi-axis robotic apparatus for performing multiple processes on a log to be used in the construction of a log home.

2. Description of the Related Art

Log construction continues to be a popular form of construction for structures such as, for example, homes. However, many log structures look very little like the early log structures which were constructed of logs which were hand-hewn from the trunks of trees. In this regard, in traditional log construction the tree trunks used for logs underwent minimal modification before incorporation into a structure. Accordingly, the height or vertical dimensions of the logs when disposed horizontally in a log structure varied along their lengths as a consequence of the natural inconsistent diameters of the trees from which the logs were derived. Of course, variations in the vertical dimensions of the logs along their lengths resulted in gaps of varying widths between adjacent logs, and these gaps were filled with a hardenable chinking material such as clay or mud. Thus, in traditional log construction not only did the vertical dimensions of the logs vary along their lengths, but the chinking joints between the logs varied in height along their lengths.

Of course, the variation in the vertical dimension of the logs along their length made construction difficult; and the resulting gaps between the logs, although they could be filled with chinking material, were undesirable. Thus, in recent years, logs used in the construction of log structures have been milled to define a uniform height or vertical dimension along their lengths. Further, rigid spacing blocks are generally disposed between the logs to span uniform gaps between the logs, with a decorative coating of chinking material being provided on exposed surfaces of the spacing blocks to give the appearance of a traditional chinking joint. However, given the uniformly dimensioned logs and uniformly dimensioned gaps there between, the appearance of the traditional log structure is lost. Examples of known log construction methods and techniques are disclosed in U.S. Pat. Nos. 5,253,458; 5,020,289; 4,951,435; 4,871,003; 4,527,981; 4,519,429; 4,509,571; 4,391,067; 4,230,163; 4,168,675; 4,167,961; 4,143,692; 4,082,129; and 3,957,095.

In addition to these references, the inventor of the invention disclosed herein, invented a Log Fabricating Process and Log for the Construction of Log Structures as disclosed in U.S. Pat. No. 5,505,028, ("the '028 patent"), issued to Randy K. Giles on Apr. 9, 1996. The '028 patent disclosed a log and an associated fabricating process for fabricating logs used in the constructions of log structures wherein the resulting log structure gives the appearance of a traditional log structure. Given that these logs have an irregular profile, i.e. varying in diameter along its length, those skilled in the art recognize that processing these logs on state-of-the-art saws, such as is depicted in the '028 patent, presents challenges in keeping the log aligned with a saw blade. Further, these type of logs undergo a series of different types of processes, requiring moving the log from one machine to another. FIGS. 1 and 2 illustrate a prior art process of preparing a log for a log home according to the teachings of the '028 patent, and an exemplary log home. Specifically, FIG. 1 illustrates the process for preparing a log as taught by the '028 patent, owned by a common assignee of the present invention. In accordance with the teachings of the '028 patent, log 10 has a first end 12 and a second end 14. Grooves 16 and 18 are cut into the log by a cutting device such as dado cutter 20. Dado cutter 20 is used to cut the longitudinal grooves 16 and 18, in accordance with the teachings of the '028 patent, such that the bottom surfaces 22 and 24 of the grooves 16 and 18 are substantially parallel to one another over the length of the log 10. Due to the varying vertical dimensions of the log 10 the resulting grooves 16 and 18 vary in depth along the length in the log 10. For example, with respect to the illustrated log 10, the grooves 16 and 18 are deeper at the first end 12 of the log 10 and become shallower toward the second end 14 as the vertical dimension of the log 10 decreases. Typically the depth of the grooves 16 and 18 varies between 0" and 4" along the length of the log 10; but a greater maximum depth can be used if desired. Further, it will be recognized by those skilled in the art that in order to keep the center line 26 of the log 10 a fixed distance from the fence 28, guide boards 30 are temporarily secured to log 10 and it is these guide boards 30 that engage fence 28. This "squares" the log 10 relative to the machine at the maximum width of the log 10.

Further, those skilled in the art will recognize that in the construction of a log home, such as illustrated in FIG. 2, the heights of the various courses of logs may vary from course to course. However, it is critical that the centerlines of the logs of each successive course be parallel. Further, those skilled in the art will recognize that there are a number of processes that must be performed on a log. And, traditionally, these different processes are performed on different machines, requiring loading a log onto a machine, executing the desired process, removing the log from a machine, and transporting the log from machine to machine.

What is missing from the art is a robotic apparatus for processing timber used in construction of a log home that is that is adapted to compensate for the irregular profile of the without the use of guide boards. What is further missing from the art is a robotic apparatus that is adapted to perform multiple cutting operations on a log without requiring moving the log from one machine to another.

BRIEF SUMMARY OF THE INVENTION

A robotic apparatus for processing the timber logs intended to be used in the construction of a log structure is described and illustrated herein. The robotic apparatus includes at least a vertical clamp assembly, a horizontal clamp assembly, a roller clamp assembly, a central log processing assembly, a conveyor, and conveyor rollers. The vertical clamp assembly is adapted to travel longitudinally along the conveyor but not drift horizontally or laterally with respect to the conveyor, thereby maintaining a fixed lateral position. This fixed lateral position eliminates the need for a "fence" as understood with reference to traditional state of the art saws. The vertical clamp assembly includes clamp members which clamp the ends of the log proximate the log's center line. This allows the robotic apparatus to "square" the log relative to the robotic apparatus based on the minimum width of log rather than "squaring" the log against a fence based on the maximum width of the log as is necessary with state of the art saws. The roller clamp assembly includes a series of horizontal and vertical roller clamps that engage a log as it enters the central log processing assembly so as to stabilize and secure the log while it is being processed in one or more processing steps as will be explained in greater detail below. The central log processing assembly, in an exemplary embodiment is centrally located, linearly, on the robotic apparatus and includes support structure, at least one upper tool mast carried by the support structure and, in an exemplary embodiment, at least one lower tool mast. At least one tool rack is also associated with the central log processing assembly. The tool rack(s) carry various tools used in processing logs for use in log structure construction. Further, each tool mast carries a tool head adapted to engage and energize the various tools carried by tool racks. The tool head can be a single axis tool head or a multiple axis, i.e. multi-axis, tool head. The robotic apparatus of the present invention allows multiple processes to be performed sequentially on the same machine requiring much less equipment and less labor in the handling of the logs. For processes that are performed on the end of the log, the robotic apparatus of the present invention further includes a horizontal clamp assembly. Horizontal clamp assembly engages the log during such processes. In this regard, when the horizontal clamp assembly engages log, the vertical clamp assembly disengages from the log and moves out of the way. By utilizing multiple tool masts, a primary mast can be performing the primary process while the secondary mast is selecting the tool appropriate to the next or secondary process.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is a top plan view of a prior art log processed in accordance with the '028 patent;

FIG. 2 is a perspective view depicting a typical construction of a log home;

FIG. 3 is a top plan view of the robotic apparatus for processing a log of the present invention;

DETAILED DESCRIPTION OF THE INVENTION

Figure 4:
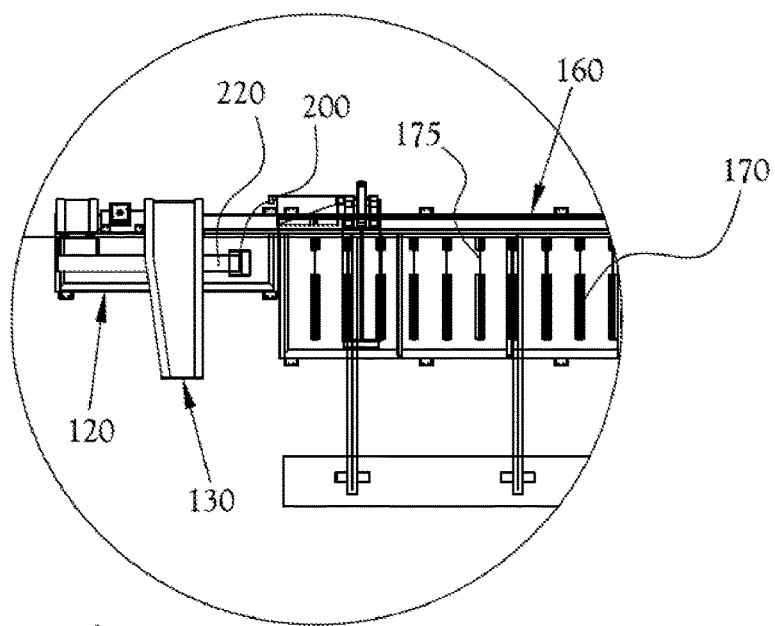
FIG. 4 is a close-up, top plan view of the robotic apparatus for processing a log, illustrated in FIG. 3, showing the first of two vertical clamping members.
Figure 5:
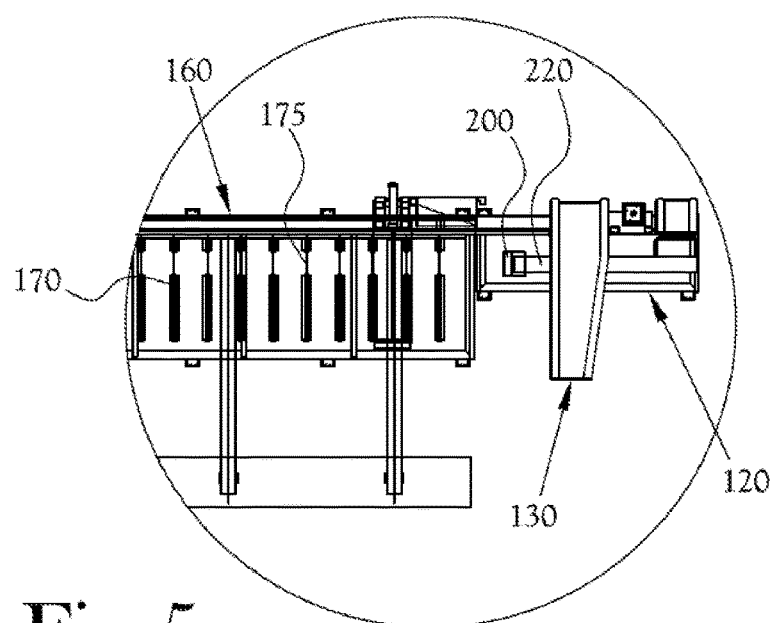
FIG. 5 is a close-up, top plan view of the robotic apparatus for processing a log, illustrated in FIG. 3, showing the second of two vertical clamping members.
Figure 6:
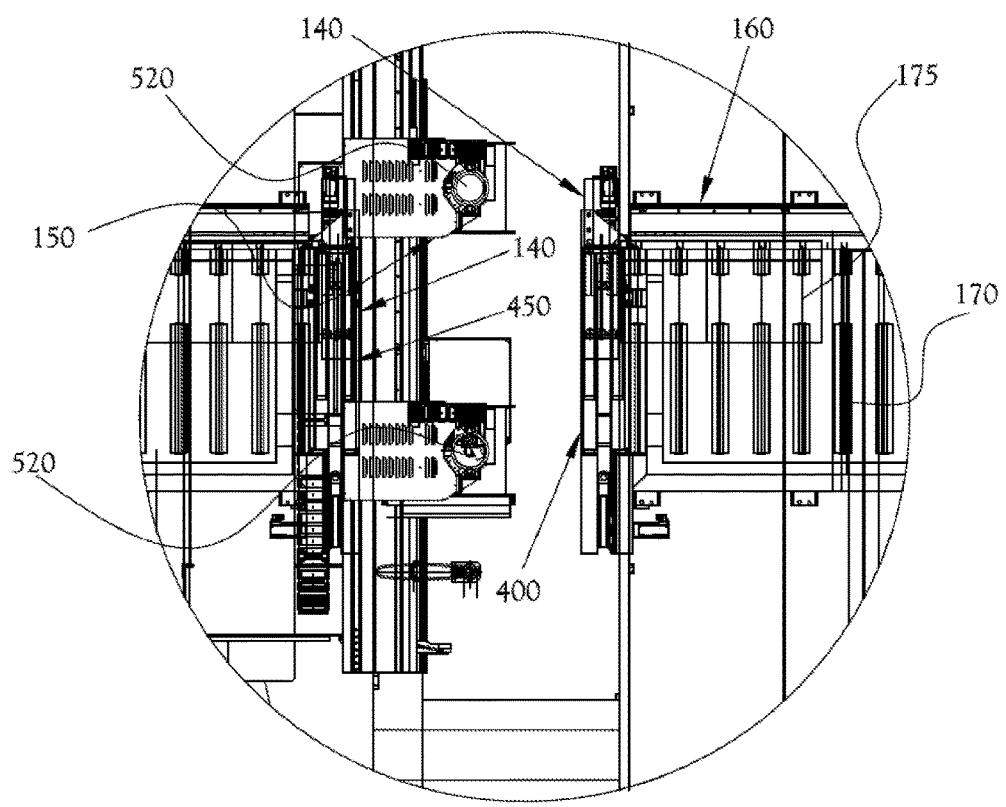
FIG. 6 is a close-up, top plan view of the central log processing assembly of the robotic apparatus for processing a log, illustrated in FIG. 3.

FIGS. 3-18 illustrate a robotic apparatus for processing the timber logs intended to be used in the construction of a log structure, such as a log home, the apparatus being referred to herein as robotic apparatus 100. Referring to FIGS. 3-6, it can be seen that robotic apparatus 100 includes various sub-assemblies. In this regard, robotic apparatus 100 includes at least a vertical clamp assembly 120, a horizontal clamp assembly 130, a roller clamp assembly 140, a central log processing assembly 150, a conveyor 160, and conveyor rollers 170. Each of these components or sub-assemblies will be described in greater detail below. As will be explained in greater detail below, the vertical clamp assembly 120 and the horizontal clamp assembly 130 traverse the length of the robotic apparatus 100 along conveyor 160. Conveyor 160 includes, in an exemplary embodiment, conveyor rollers 170. In order to allow the support members (not shown) for the vertical clamp assembly 120 to pass through the series of conveyor rollers 170, conveyor rollers 170 are provided with a gap 175 therein.

Figure 7:
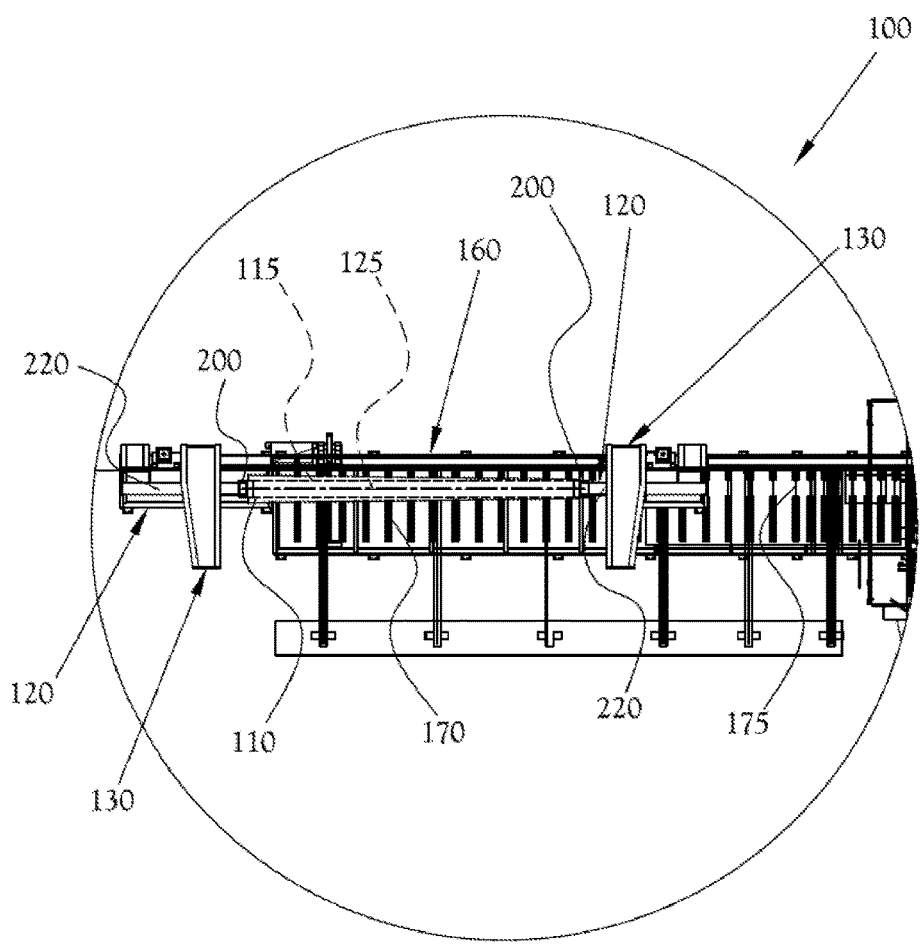
FIG. 7 is a close-up top plan view of the first and second vertical clamp members engaged with a log to be processed by the robotic apparatus for processing log, illustrated in FIG. 3.

Vertical Clamp Assembly 120 includes clamp members 200 for clamping the ends of log 110 as seen in FIG. 7. The clamp members 200 are adapted to travel longitudinally but do not drift horizontally. Further, clamp members 200 are carried and supported by vertical clamp support arm 220. Clamp members 200 represent a fixed lateral position. This fixed lateral position eliminates the need for a "fence" as understood with reference to traditional state of the art saws. Clamp members 200 grasp and clamp the ends of the log 110 proximate the log's center line 125. This allows the robotic apparatus 100 to "square" the log relative to the robotic apparatus 100 based on the minimum width of log 110 rather than "squaring" the log against a fence based on the maximum width of the log as is necessary with state of the art saws. In an exemplary embodiment, the log 110 is clamped by clamp members 200 such that the center line 125 of log 110 is at a fixed lateral position with respect to the conveyor and the robotic apparatus 100. This allows robotic apparatus 100 to treat the irregular width log 110 as though the log 110 had a consistent, regular width without the need for guide boards such as are used with state of the art milling machines which are forced to horizontally press a log against a fence.

By clamping log 110 at its ends, the sides of the log are exposed such that longitudinal groove 115 can be cut. Additionally, other processes, such as slotting, hewing, drilling utility pathways, etc. can be performed at this point. In this regard, in some applications, it may be desirous to cut mortices at load bearing points, as will be understood by those skilled in the art, without milling a full-length longitudinal groove 115. By fixing center line 125 of log 110 at a fixed point with clamp members 200, the depth of the mortices, relative to the center line 125 of log 110 are uniform allowing for use of uniformly sized bearing blocks as will be understood by those skilled in the art.

Roller Clamp Assembly 140 includes a series of horizontal and vertical roller clamps that engage a work piece, such as log 110 as it enters the central log processing assembly 150 so as to stabilize and secure the log 110 while it is being processed by one or more processing steps as will be explained in greater detail below. In this regard, it will be appreciated that some operations require the log to be immobilized, while other operations, such as a ripping operation require the log to be stabilized and secured so as to prevent any lateral drift of the log while allowing longitudinal travel of the log. To this end, roller clamp assembly 140 includes two primary sub-assemblies which are positioned on each side of central log processing assembly 150, such that sub-assembly 400 and sub-assembly 450 cooperate to stabilize and secure log 110 while it is being processed. Sub-assemblies 400 and 450 are actuable to move longitudinally along a selected length of robotic apparatus 100. In an exemplary embodiment, sub-assemblies 400 and 450 can be actuated in synchronous fashion or can be actuated independently.

In an exemplary embodiment vertical roller clamps 405 and 455, and horizontal roller clamps 410 and 460 of sub-assemblies 400 and 450, respectively, are stationary with respect in relation to their respective sub-assemblies, i.e. vertical roller clamps 405 and 455 travel longitudinally with their respective sub-assemblies but don't, in an exemplary embodiment, move laterally into the work space. By contrast vertical roller clamps 425 and 475 and horizontal roller clamps 420 and 470 are adapted to move laterally so as to clamp log 110 against vertical roller clamps 405 and 455, and horizontal roller clamps 410 and 460 of sub-assemblies 400 and 450.

Central Log Processing Assembly 150, in an exemplary embodiment is centrally located, linearly, on robotic apparatus 100. Central log processing assembly 150 includes support structure 500, which, as will be described in greater detail below is positioned over machine pit 510. Further, central log processing assembly 150 includes, in an exemplary embodiment, at least one upper tool mast 520 carried by support structure 500 and at least one lower tool mast 530. Also mounted on support structure 500, in an exemplary embodiment, is at least one tool rack 540. In an exemplary embodiment, a tool rack 540 is provided for each tool mast. Tool racks 540 carry various tools used in processing logs for use in log structure construction, including, without limitation, a universal mill 542 for cutting the longitudinal groove 115 in log 110, in one exemplary embodiment, a circular saw blade attachment 544, drill bits 546, milling tools 547 for various processes such as cutting dovetail joints or tenons, and a slotting tool, often referred to as a slotter 548. For instance, the log 110, in an exemplary embodiment, may undergo a number of processes, including planing the log's exterior surfaces, cutting the log to a desired length, cutting the longitudinal groove 115, slotting, "randomized" hewing on the exterior of the log, for example to process the surface of the log.

Figure 19:
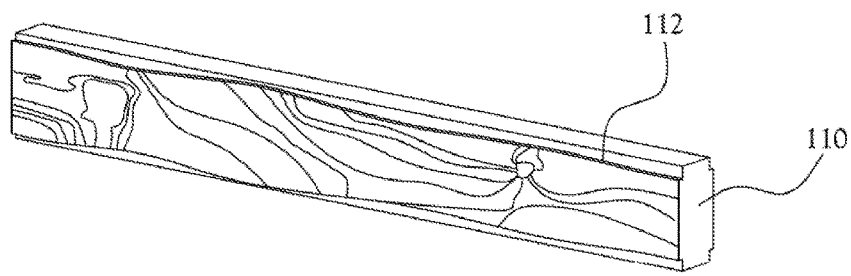
FIG. 19 is a perspective view of a log with a faux-natural irregular contour milled into the surface of the log by the apparatus of present invention.
Figure 20:
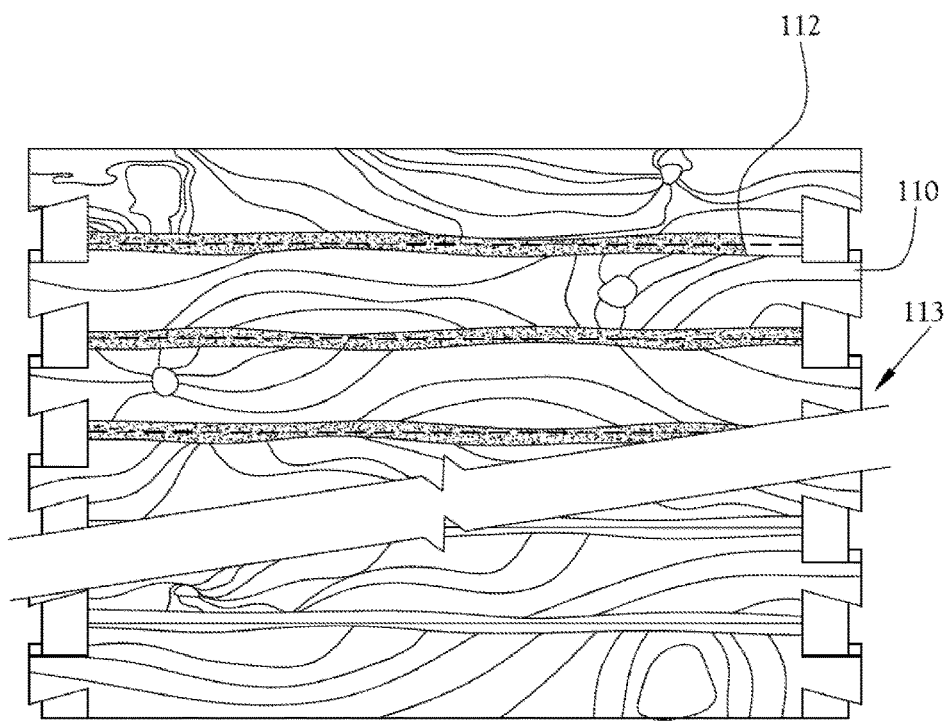
FIG. 20 is an elevation view of a wall constructed with the log illustrated in FIG. 19.
Figure 21:
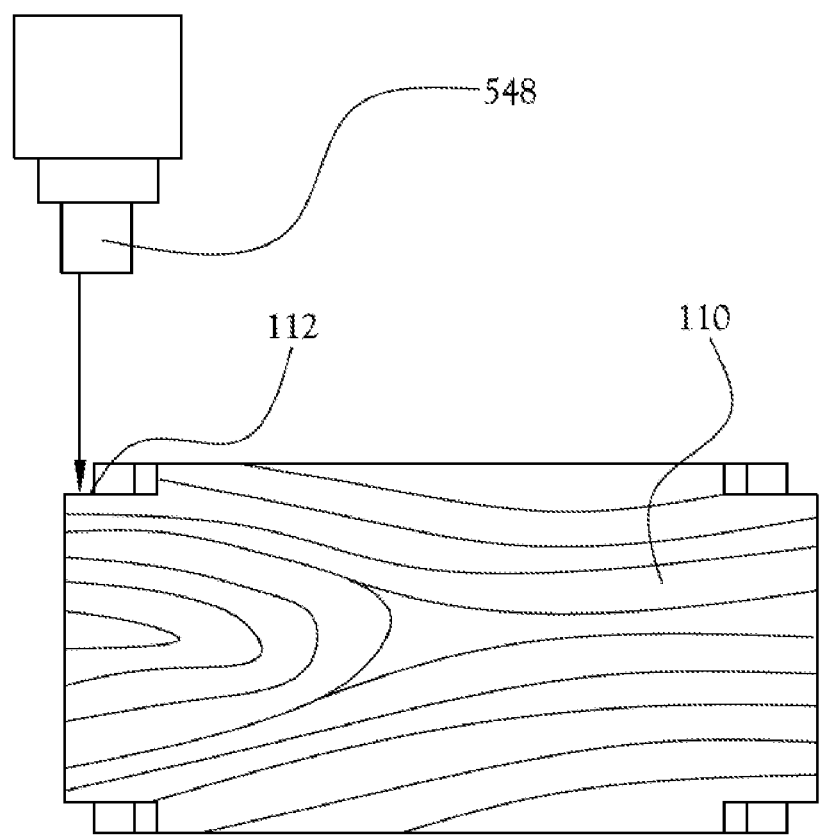
FIG. 21 is an elevation view of the milling tool, carried by the apparatus of the present invention, engaging the log illustrated in FIG. 19.

In this regard, as illustrated in FIGS. 19-21, a tool, such as slotter 548 can be utilized to cut a "faux-natural" irregular edge to a processed log, such as log 110. For example, an irregular contour 112 could be milled into the face of a rectangular log 110, by routing a relatively shallow irregular line on the face of the log that will later be covered with chinking in order to create the irregular line that is reminiscent of the natural irregularity of logs hand-hewn from the trunks of trees. Similarly, a "faux-natural" hand hewn appearance could be created by milling off the corners of the timber thus simulating the shape of a tree log. These shapes could be generated randomly by the computer, or by use of pre-set patterns stored within a database in the computer. This technique could be utilized in traditional chinked log wall construction, such as log wall 113 in FIG. 20, as well as with log walls that are stacked and joined by tongue and groove construction techniques. Further, the end of the log can be milled to create dovetails or tenons, and drilling can be accomplished to create utility pathways. The robotic apparatus 100 of the present invention uniquely allows a variety of patterns, various sweeps, curves, knot protrusions, and bows, to be milled into the surface, and also allows a natural appearing irregular shape that mimics the shape of a tree, i.e. as described above in which one end has a larger diameter than the other to be carved into the surface of the log.

Tool masts 520 and 530 each carry a tool head 550 adapted to engage and energize the various tools carried by tool racks 540. In addition to tool head 550, tool masts 520 and 530 can, in an exemplary embodiment, carry a multi-axis tool head 560 that can engage and energize the various tools carried by tool racks 540 and can rotate such tools through multiple axis of rotation thus allowing for various processes to be performed by the central log processing assembly 150. For instance, central log processing assembly 150 can use circular saw 544 on the multi-axis head 560 to cut a log to a selected length; tool head 550 can retrieve universal mill 542 from tool rack 540 and cut longitudinal groove 115; and, as a further example, multi-axis head 560 can retrieve a milling tool 547 from tool rack and cut a dovetail joint, or other tenon in the end of log 110. The robotic apparatus 100 of the present invention allows much greater precision in the cutting of the longitudinal grooves and allows for multiple processes to be performed sequentially on the same machine requiring much less equipment and less labor in the handling of the logs. Further, while the dado head, i.e. the universal mill 542 is illustrated as being carried by a 3-axis mast on a vertical shaft, in a further exemplary embodiment, universal mill 542, or a dado cutter of a differing configuration, could be carried by a multi-axis tool head. In this regard, universal mill 542, cuts the rectangular groove 115, which could include a number of tongue and groove interlocking shapes, in which the "walls" of the groove are parallel, and as will be recognized by those skilled in the art will recognize, vertical once the logs are installed as walls.

However, in a further embodiment, it may be desirous for these vertical walls of the groove to be inclined. In this regard, as is understood by those skilled in the art, chinking is typically installed in the groove between courses of logs. This requires the insertion of a material in the groove to chink against, such as a rigid block of insulation (thick or thin), a piece of wood, something quite thin, etc. This results in chinking being applied to a vertical support surface. Vertical chinking is problematic in that rain could travel down the chinking. Traditionally, the chinking would be applied on a slope or angle, which would create a "chink wall" that starts somewhat under the edge of the log above, but angles outwards nearer the edge of the log below. By utilizing a cone-shaped head on a multi-axis head, such that the drive shaft of the head is horizontal, the longitudinal groove ("dado") could have a shape that would be, when installed, less than 90 degrees, such that the vertical wall of the groove could be "angled" rather than 90 degrees vertical, thereby allowing the opportunity for the application of chinking against the angled surface of the dado wall, thus shedding water better.

Figure 8:
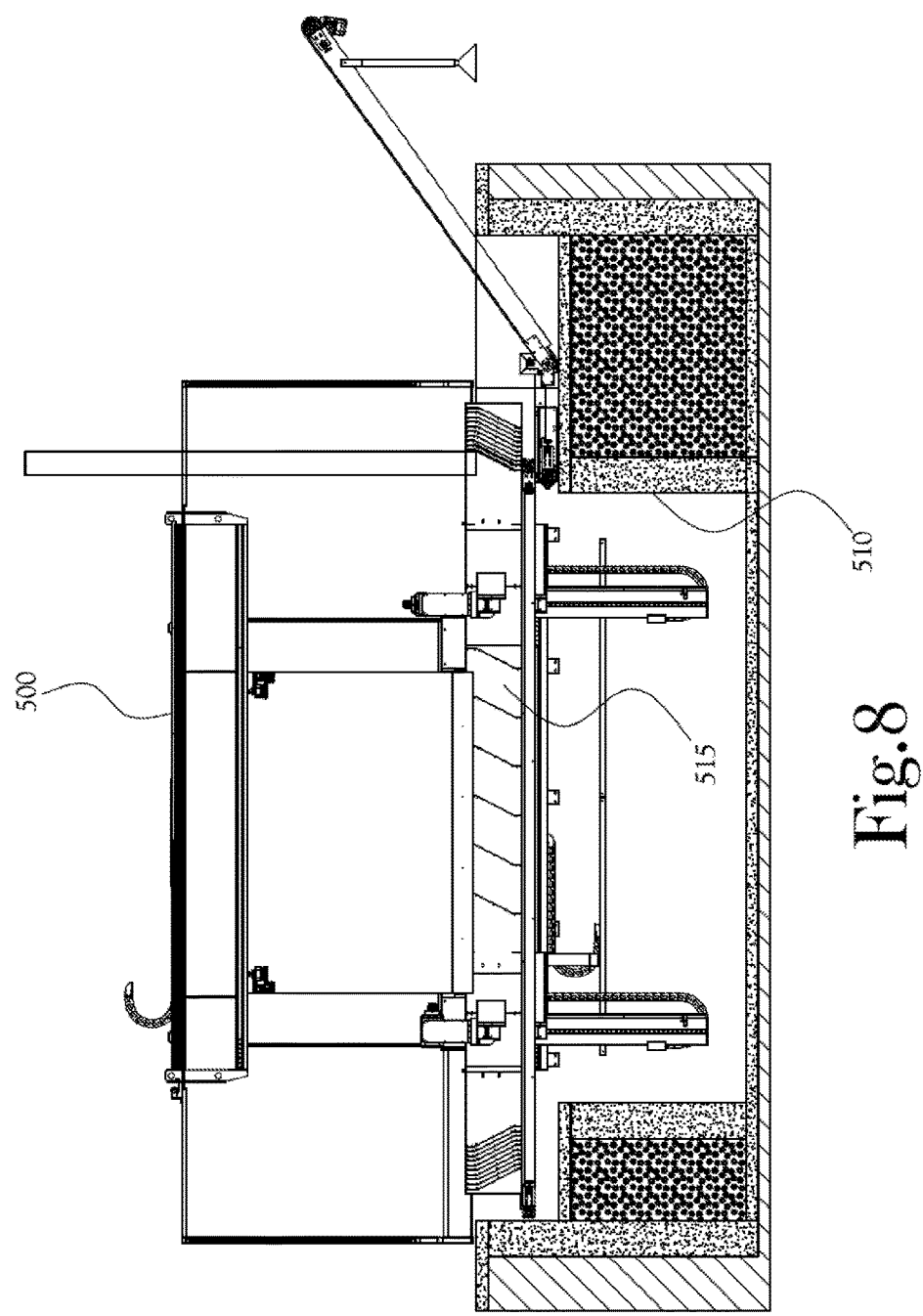
FIG. 8 is a view in section showing the machine pit for the central log processing assembly of the robotic apparatus for processing a log taken at line A in FIG. 3. The masts for supporting the robotic processing members have been removed for clarity of view.
Figure 9:
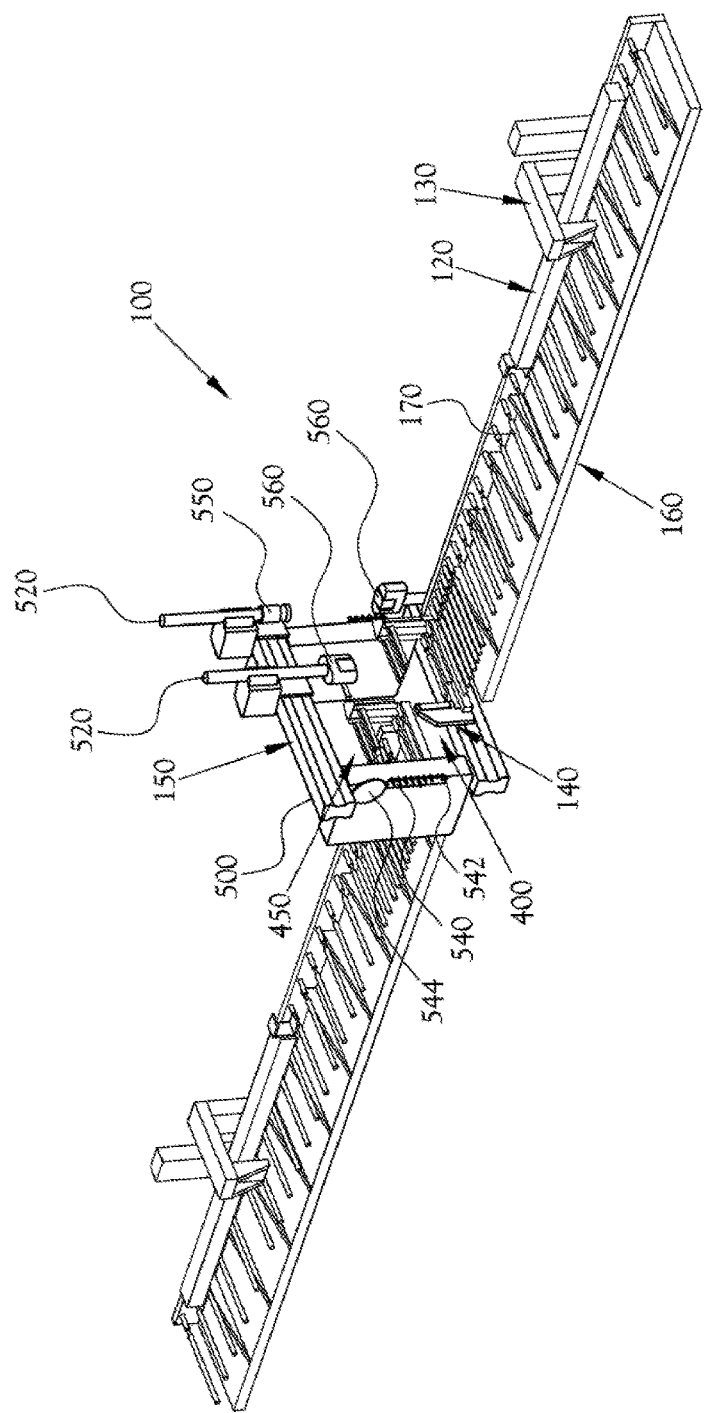
FIG. 9 is a perspective view of the robotic apparatus for processing a log of the present invention.
Figure 10:
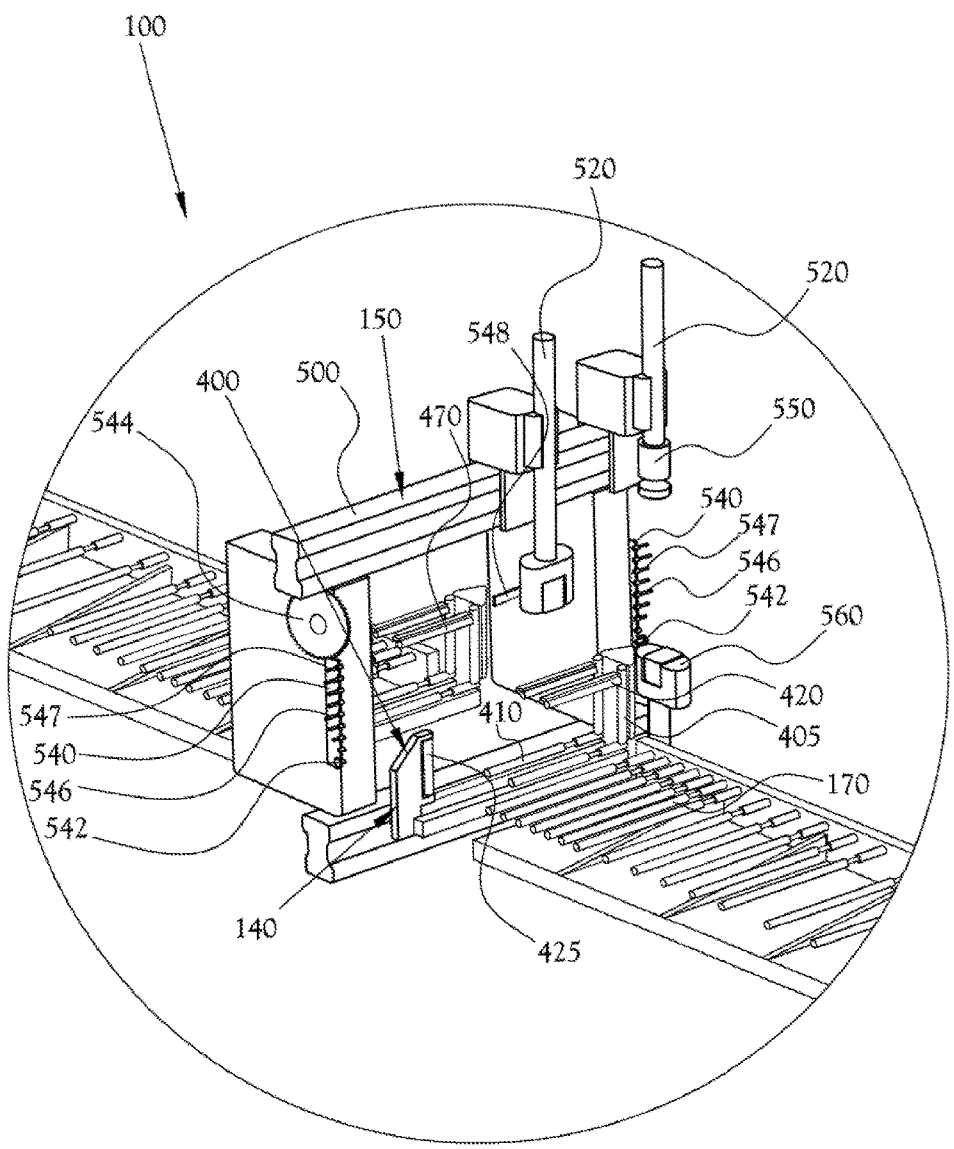
FIG. 10 is a perspective view of the robotic apparatus for processing a log of the present invention illustrating the three robotic tool masts associated with the central log processing assembly.
Figure 11:
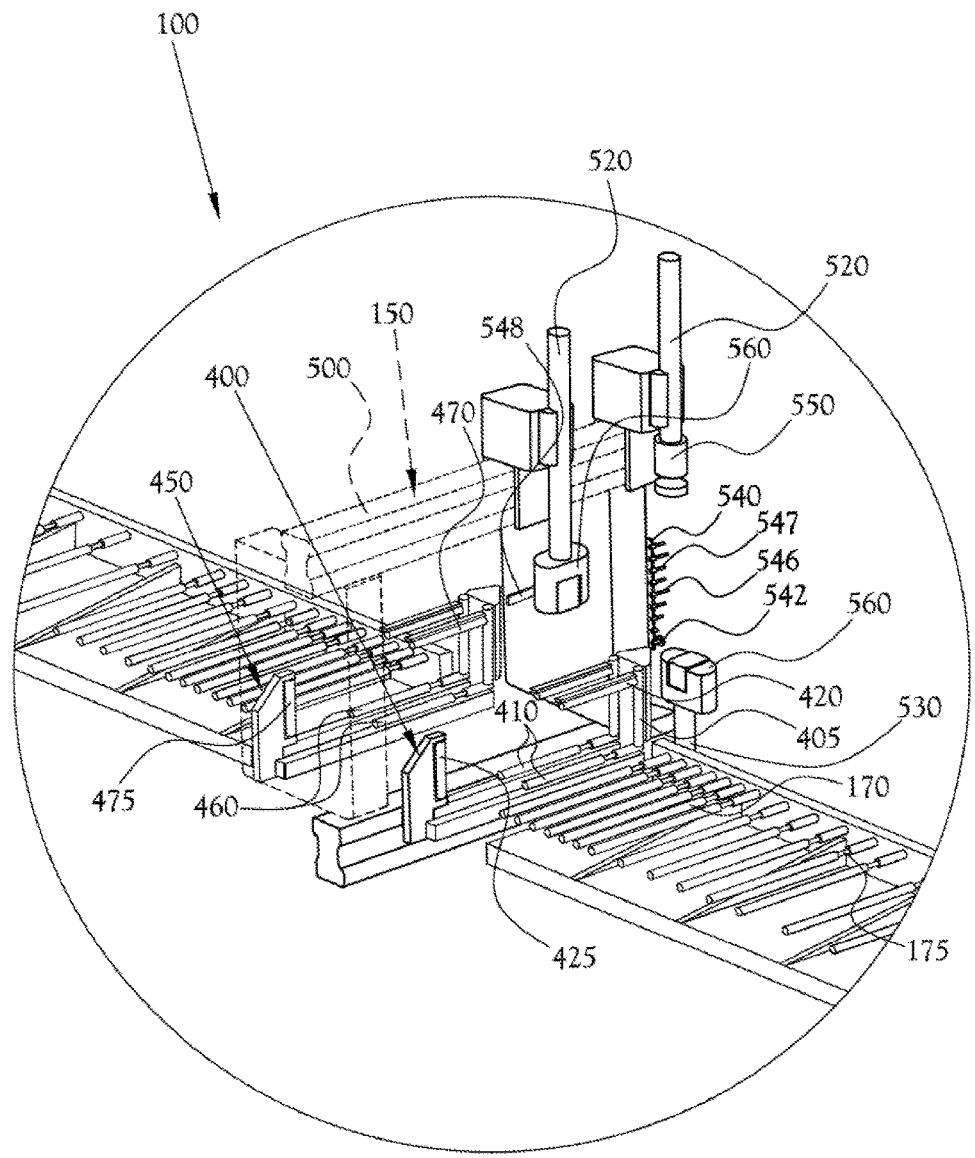
FIG. 11 is a perspective view of the roller clamp assembly of the robotic apparatus of the present invention.
Figure 12:
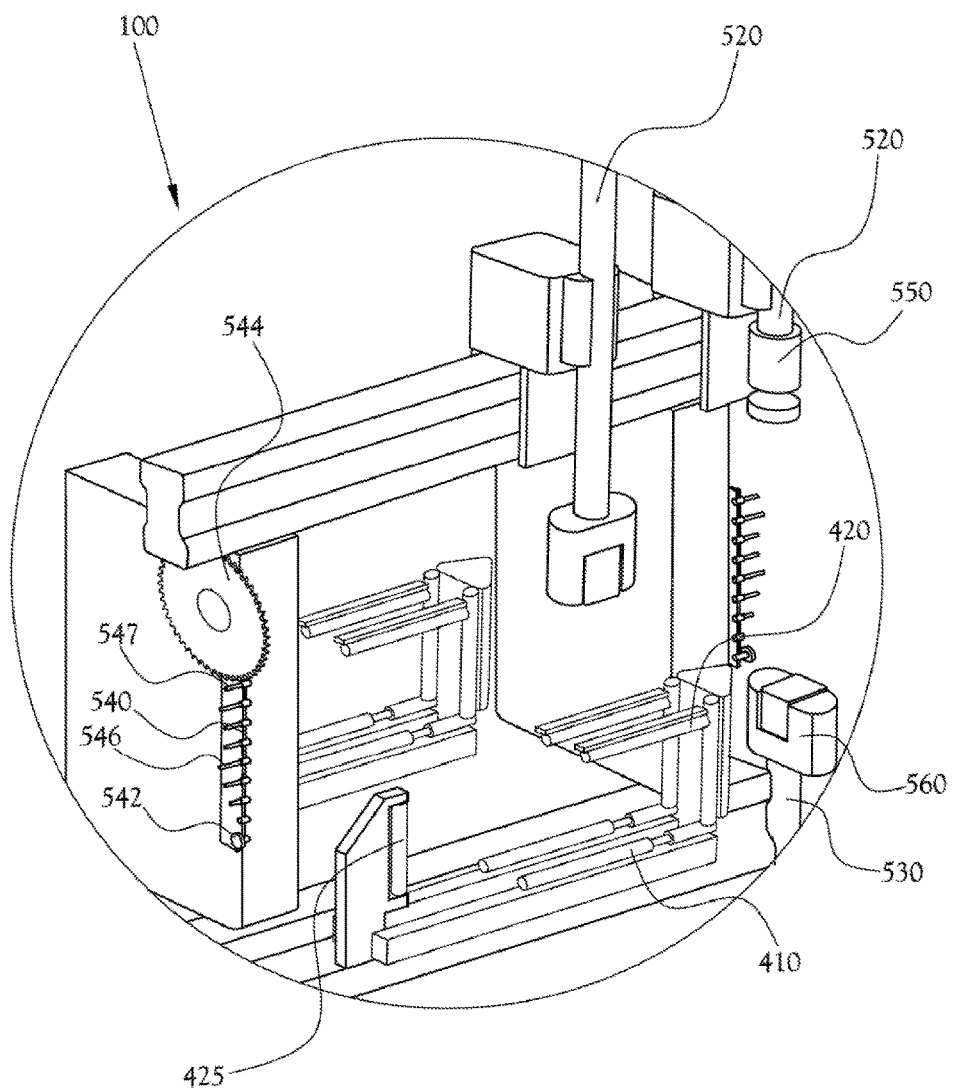
FIG. 12 is a perspective view illustrating a tool rack associated with the central log processing assembly and the roller clamp assembly.

As best illustrated in FIG. 8, support structure 500 is positioned over a machine pit 510 which allows for various components of the central log processing assembly 150 to extend below conveyor 160. In FIG. 8, which shows support structure 500 and machine pit 510, various other components such as the tool masts 520 and 530, tool racks 540, etc. have been removed for clarity of view. It will be further appreciated that machine pit 510 allows access to these components for maintenance purposes. It will also be appreciated that a scrap conveyor 515 can be provided for removing sawdust, shavings, and other cut remnants from machine pit 510.

Horizontal Clamp Assembly 130: It will be appreciated by those skilled in the art that while various of the processes described above are performed along the longitudinal surface of the log 110 while the log 110 is engaged by the vertical clamp assembly 120, certain processes described above, especially the processes that are performed on the end of the log 110 will require access to the end of the log 110, which, in turn requires disengagement of vertical clamp assembly 120. After disengagement of vertical clamp assembly 120, horizontal clamp assembly 130 engages the log 110 for such processes. In this regard, when horizontal clamp assembly 130 engages log 110, vertical clamp assembly 120 disengages from the log and moves out of the way, for example, to the positions illustrated in FIGS. 3 and 9. In an exemplary embodiment, horizontal clamp assembly 130 includes at least a pair of opposing bosses 300 which register with and engage longitudinal groove 115.

Figure 13:
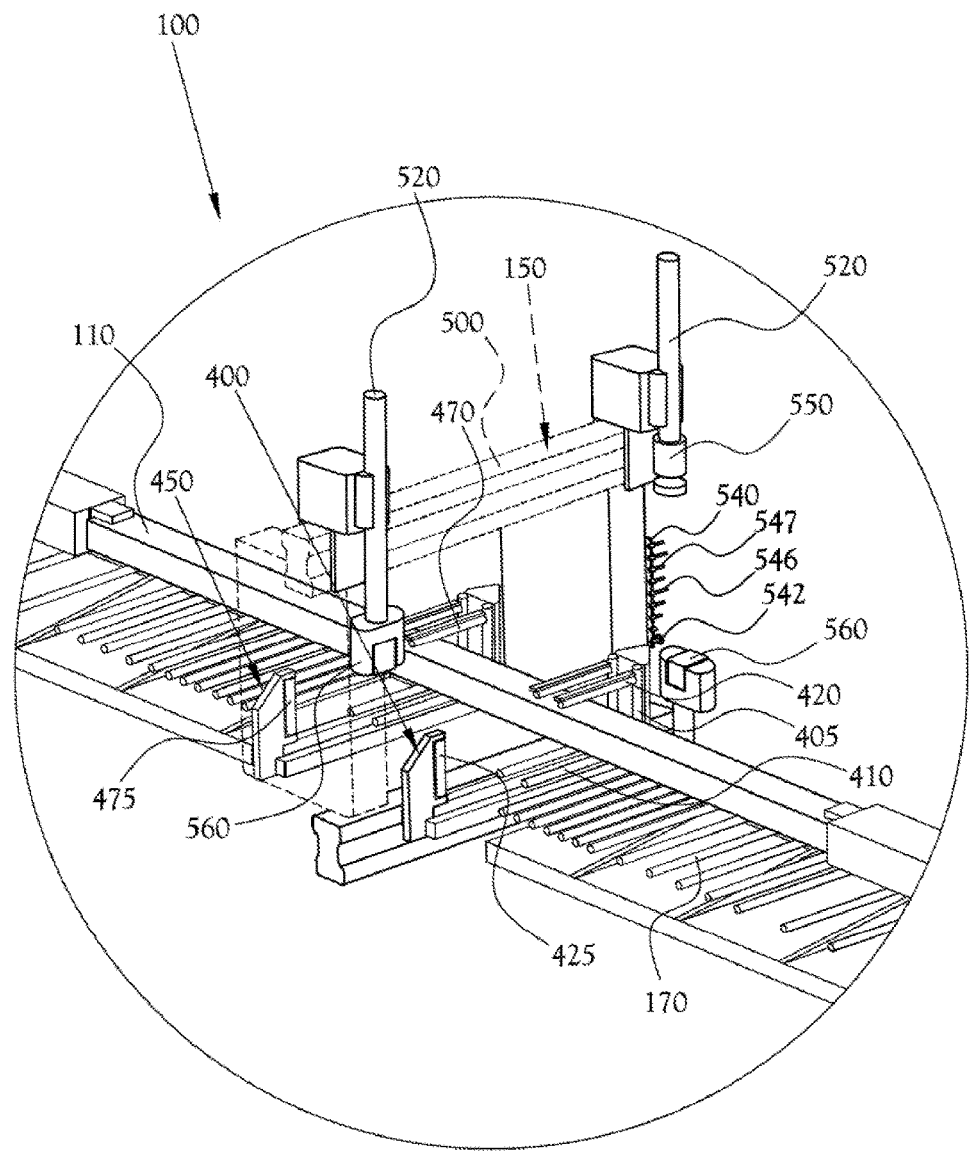
FIG. 13 is a perspective view illustrating an exemplary log to be processed and a circular saw tool attachment attached to the first tool mast.
Figure 14:
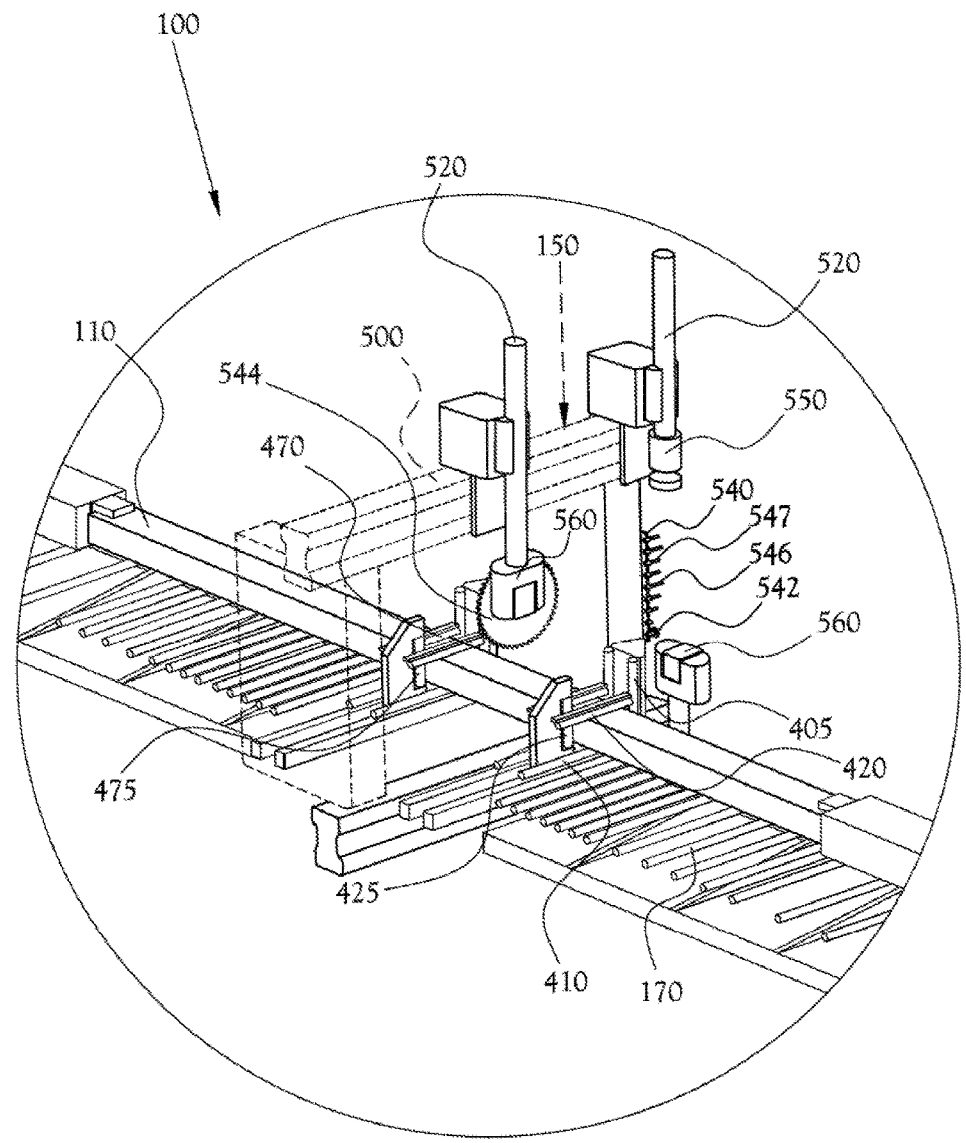
FIG. 14 is a perspective view illustrating an exemplary log to be processed in which the circular saw tool attachment has started to move into position to cut the exemplary log and the third tool mast has moved into position to retrieve a tool from the tool rack.
Figure 15:
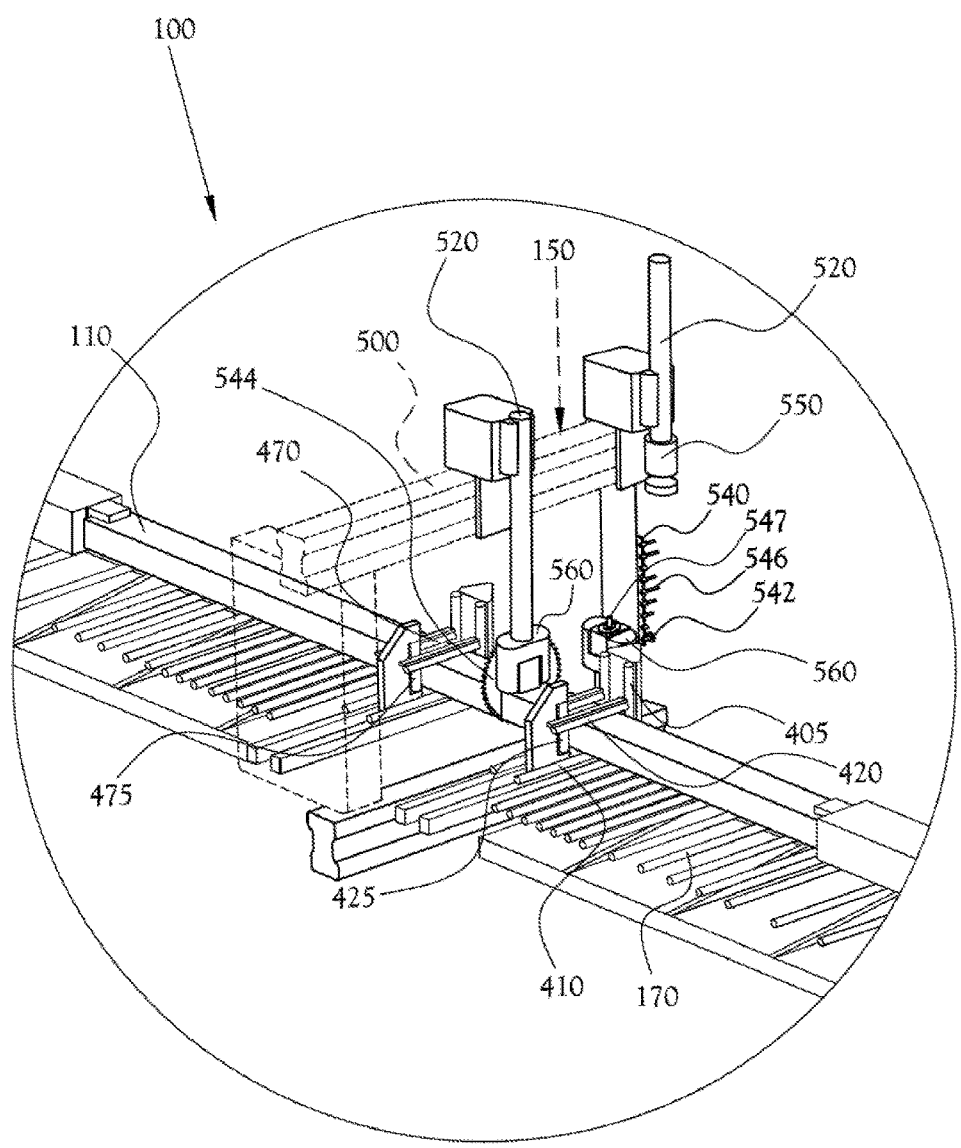
FIG. 15 is a perspective view illustrating an exemplary log to be processed in which the circular saw tool attachment has moved into position to cut the exemplary log.
Figure 16:
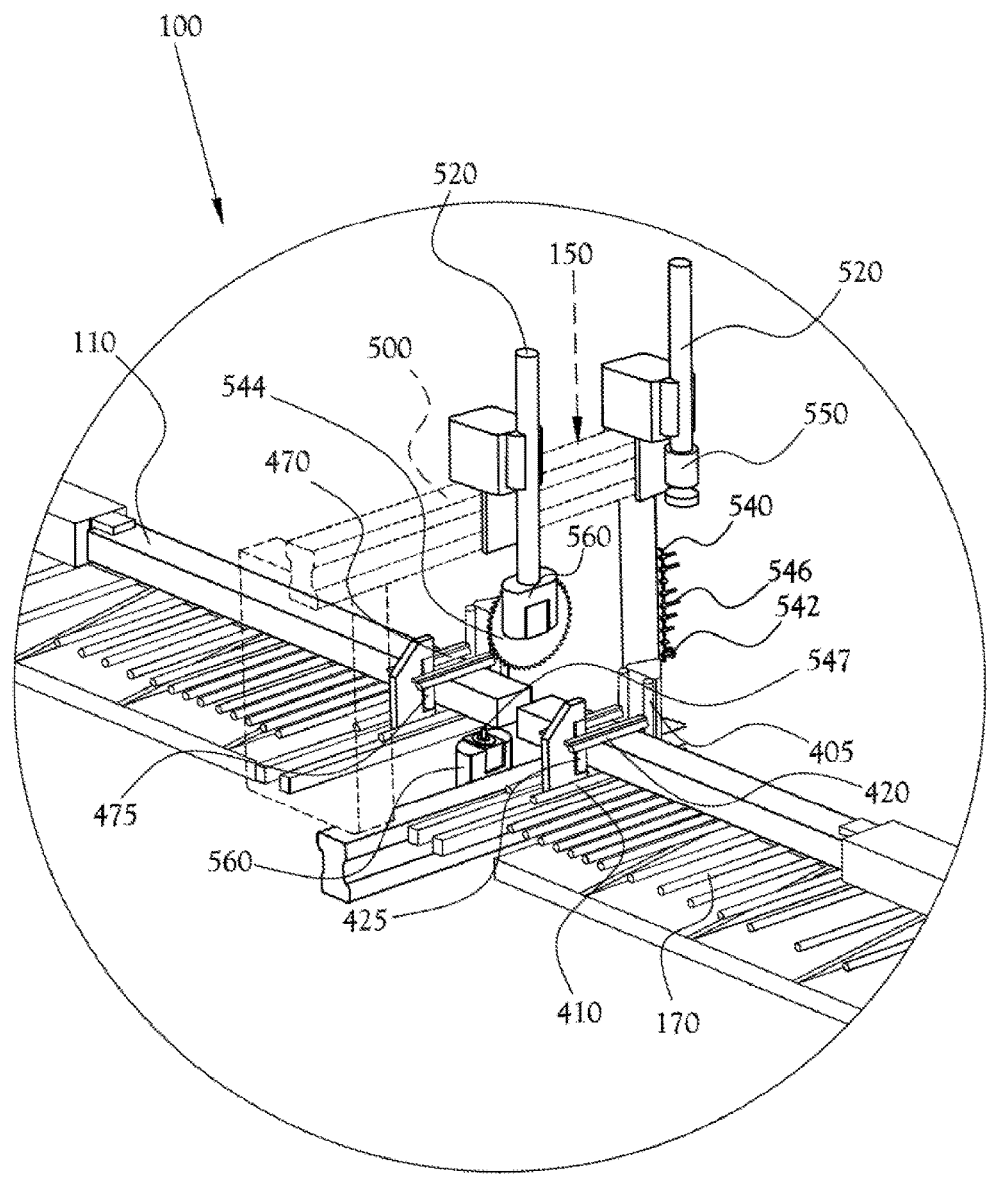
FIG. 16 is a perspective view illustrating an exemplary log to be processed in which the circular saw tool attachment has cut the exemplary log and moved out of position and the third tool mast and its robotic multi-axis tool head has retrieved a mill bit and is processing the end of the exemplary log.
Figure 17:
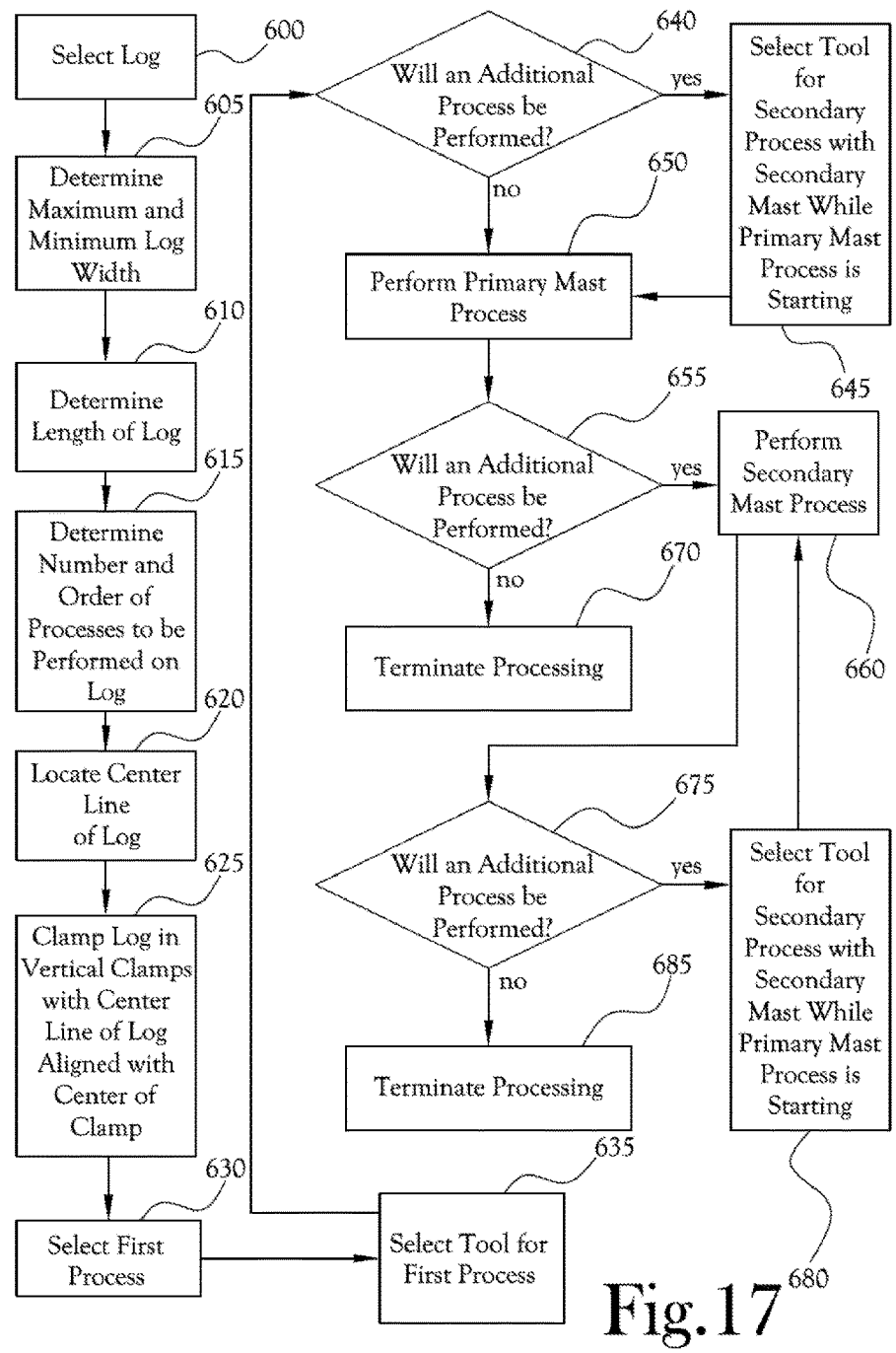
FIG. 17 is a flow chart outlining the process of using the robotic apparatus of the present invention to process a log to be used in the construction of a log home.
Figure 18:
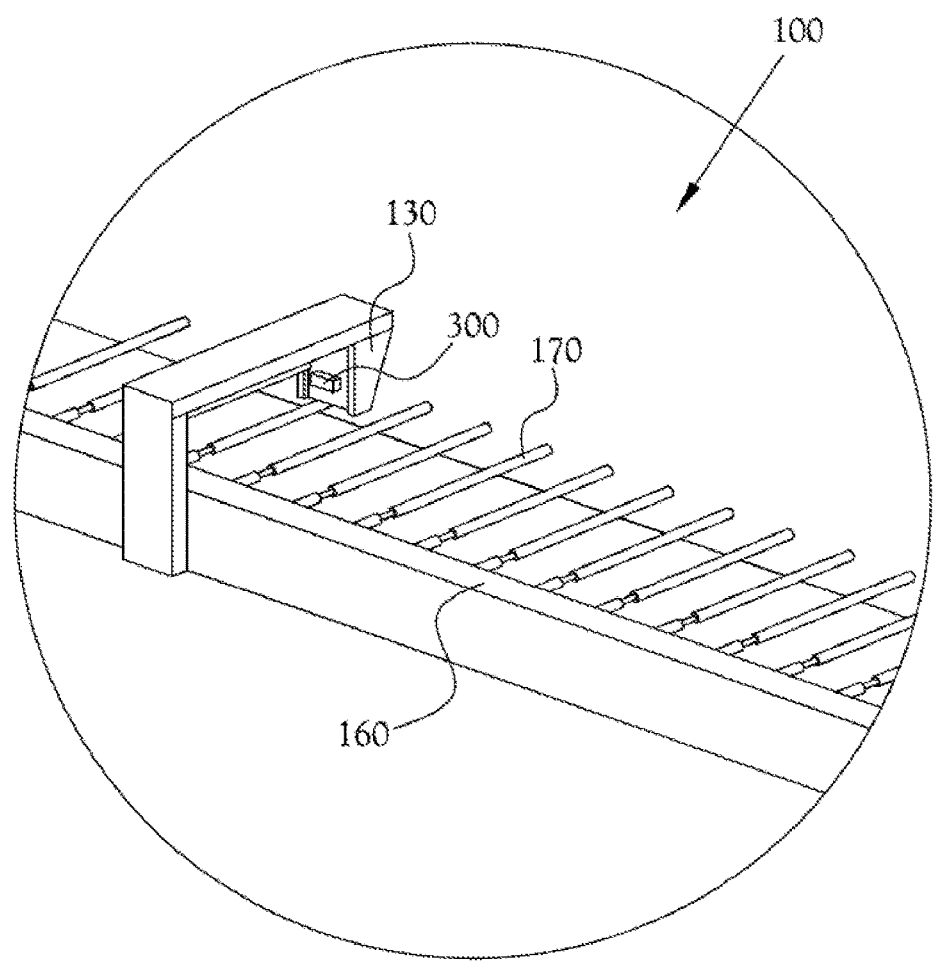
FIG. 18 is a close-up perspective view of the horizontal clamp assembly of the robotic apparatus of the present invention.

Referring to FIGS. 13-17, the use of the robotic apparatus 100 of the present invention will be explained with reference to two exemplary processes that may be performed on an exemplary log 110. In this regard, a log 110 is selected from inventory at step 600. The maximum and minimum width of the log is determined 605 and the length of the log is determined 610. Then, the number, identity, and order of processes to be performed on log is determined 615. The center line of the log is located 620; and the log is clamped 625 by vertical clamps 200 with center line of log aligned with center of clamp. The first process is selected 630 and the tool for the first process is selected 640. In FIG. 13, the first process to be performed is cutting log 110 to a specific length using circular saw blade 544 which is mounted on a multi-axis tool head 560 carried by upper mast 520. If there are additional processes to be performed 640, the tool for the second process will be selected by a secondary mast, which as seen in FIG. 15, is lower mast 530. In the exemplary process illustrated in FIGS. 13-16, lower mast 530, which is carrying a multi-axis tool head 560 will select a milling bit in order to cut a tenon as seen in FIG. 16, as the secondary process 660. If only a single process is to be performed the process will terminate at 670. Thus, by utilizing multiple tool masts 520 and 530, a primary mast can be performing the primary process 650 while the secondary mast is selecting the tool appropriate to the next or secondary process.

While the secondary process is being performed, an inquiry is made as to whether an additional process will be performed 675; and if not the log processing is terminated 685. If there are additional processes to be performed, the appropriate tool for the next process is selected while the present process is being performed 680. This process is repeated until all log processing steps are completed at which time log processing is terminated. While this process has been explained as a series of questions that are asked during the processing of the log, those skilled in the art will recognize that the entire log processing program could be pre-programmed into the machine under computer processing control and each of the steps performed sequentially. It should be recognized that while one tool mast is performing a process a secondary tool mast is selecting the tool appropriate for the next selected process.

Thus, it can be appreciated by those skilled in the art that the robotic apparatus 100 of the present invention can perform one or more of the following processes: planing the exterior surfaces of a log such as log 110, cutting log 110 to a desired length, cutting the longitudinal groove as described above, slotting using a slotter, hewing the exterior of the log 110 to create, among other things, various "faux-natural" contours, milling the end of log 110 to create dovetails or tenons, and drilling log 110 to create utility pathways. It will be appreciated by those skilled in the art that various of these processes, i.e. the longitudinal processes, will be performed while log 110 is clamped by the vertical clamp assembly 120; and, that other processes, such as, for example, the millwork performed on the end of the log 110, will necessitate the log 110 being handed off from the vertical clamp assembly 120 to the horizontal clamp assembly 130. When the horizontal clamp assembly 130 engages log 110, vertical clamp assembly 120 moves to the distal ends of the robotic apparatus 100.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art.

Having thus described the aforementioned invention, what is claimed is:

1. A robotic apparatus for processing logs to be used in the construction of a log structure, said robotic apparatus comprising:
   a central log processing assembly including a support member, at least one tool mast carried by said support member and a tool rack for carrying a plurality of tools for processing the log, wherein said at least one tool mast includes a tool head adapted to engage and energize a selected tool carried by said tool rack;
   a linear conveyor assembly for conveying logs to said central log processing assembly;
   a vertical clamp assembly for clamping ends of said log proximate a longitudinal center line, the vertical clamp assembly being adapted to travel longitudinally along said conveyor assembly and defining a fixed lateral position;
   a roller clamp assembly proximate said central log processing assembly for stabilizing and securing the log while the log is being processed by said central log processing assembly; and
   a horizontal clamp assembly for engaging sides of the log, said horizontal clamp assembly being adapted to travel longitudinally along said conveyor assembly, whereby said robotic apparatus for processing logs allows multiple processes to be performed sequentially on a single machine.

2. The robotic apparatus for processing logs to be used in the construction of a log structure of claim 1 wherein said central log processing assembly includes at least two upper tool masts carried by said support member and at least one lower tool mast.

3. The robotic apparatus for processing logs to be used in the construction of a log structure of claim 2 wherein said support member is disposed over a machine pit.

4. The robotic apparatus for processing logs to be used in the construction of a log structure of claim 1 wherein said central log processing assembly includes at least two tool masts whereby while a primary tool mast is performing a selected process, a secondary tool mast selects a tool appropriate for a secondary process.

5. The robotic apparatus for processing logs to be used in the construction of a log structure of claim 1 wherein at least one said tool head is a multi-axis tool head.

6. The robotic apparatus for processing logs to be used in the construction of a log structure of claim 1 wherein said tools are selected from a group consisting of a circular saw, a universal mill, a drill, and a milling tool.

7. A robotic apparatus for processing logs to be used in the construction of a log structure, said robotic apparatus comprising:
   a central log processing assembly including a support member, includes at least two upper tool masts carried by said support member and at least two tool racks for carrying a plurality of tools for processing the log, wherein said at least one tool mast includes a tool head adapted to engage and energize a selected tool carried by said tool rack;
   a linear conveyor assembly for conveying logs to said central log processing assembly;
   a vertical clamp assembly for clamping ends of said log proximate a longitudinal center line, the vertical clamp assembly being adapted to travel longitudinally along said conveyor assembly and defining a fixed lateral position;
   a roller clamp assembly proximate said central log processing assembly for stabilizing and securing the log while the log is being processed by said central log processing assembly; and
   a horizontal clamp assembly for engaging sides of the log, said horizontal clamp assembly being adapted to travel longitudinally along said conveyor assembly, whereby said robotic apparatus for processing logs allows multiple processes to be performed sequentially on a single machine.

8. The robotic apparatus for processing logs to be used in the construction of a log structure of claim 7 wherein said central log processing assembly includes at least one lower tool mast carried by said support member and an additional tool rack carried by said support member proximate said at least one lower tool mast.

9. The robotic apparatus for processing logs to be used in the construction of a log structure of claim 8 wherein said support member is disposed over a machine pit.

10. The robotic apparatus for processing logs to be used in the construction of a log structure of claim 7 wherein said central log processing assembly includes at least two tool masts whereby while a primary tool mast is performing a selected process, a secondary tool mast selects a tool appropriate for a secondary process.

11. The robotic apparatus for processing logs to be used in the construction of a log structure of claim 7 wherein at least one said tool head is a multi-axis tool head.

12. The robotic apparatus for processing logs to be used in the construction of a log structure of claim 1 wherein said tools are selected from a group consisting of a circular saw, a universal mill, a drill, and a milling tool.

13. A robotic apparatus for processing logs to be used in the construction of a log structure, said robotic apparatus comprising:
   a central log processing assembly having a support member disposed over a machine pit, at least a first upper tool mast carried by said support member and a second upper tool mast carried by said support member, a first tool rack mounted on said support member proximate said first upper tool mast and a second tool rack mounted on said support member proximate said second upper tool mast, each of said first and second tool racks being adapted for carrying a plurality of tools for processing the log wherein said tools are selected from a group consisting of a circular saw, a universal mill, a drill, and a milling tool, wherein each of said at least two upper tool masts includes a tool head adapted to engage and energize a selected tool carried by said tool rack;
   a linear conveyor assembly for conveying logs to said central log processing assembly;
   a vertical clamp assembly for clamping ends of said log proximate a longitudinal center line, the vertical clamp assembly being adapted to travel longitudinally along said conveyor assembly and defining a fixed lateral position;
   a roller clamp assembly proximate said central log processing assembly for stabilizing and securing the log while the log is being processed by said central log processing assembly; and a horizontal clamp assembly for engaging sides of the log, said horizontal clamp assembly being adapted to travel longitudinally along said conveyor assembly, whereby said robotic apparatus for processing logs allows multiple processes to be performed sequentially on a single machine.

14. The robotic apparatus for processing logs to be used in the construction of a log structure of claim 13 wherein said central log processing assembly includes at least one lower tool mast carried by said support member and an additional tool rack carried by said support member proximate said at least one lower tool mast.

15. The robotic apparatus for processing logs to be used in the construction of a log structure of claim 14 wherein said central log processing assembly includes at least two tool masts whereby while a primary tool mast is performing a selected process, a secondary tool mast selects a tool appropriate for a secondary process.

16. The robotic apparatus for processing logs to be used in the construction of a log structure of claim 14 wherein at least one said tool head is a multi-axis tool head.

17. The robotic apparatus for processing logs to be used in the construction of a log structure of claim 14 wherein said tools are selected from a group consisting of a circular saw, a universal mill, a drill, and a milling tool.

\* \* \* \* \*